(No Model.) 2 Sheets—Sheet 1.
C. G. SCHULZE.
PRESS FOR MOLDING VULCANIZED RUBBER STAMPS, &c.
No. 419,290. Patented Jan. 14, 1890.
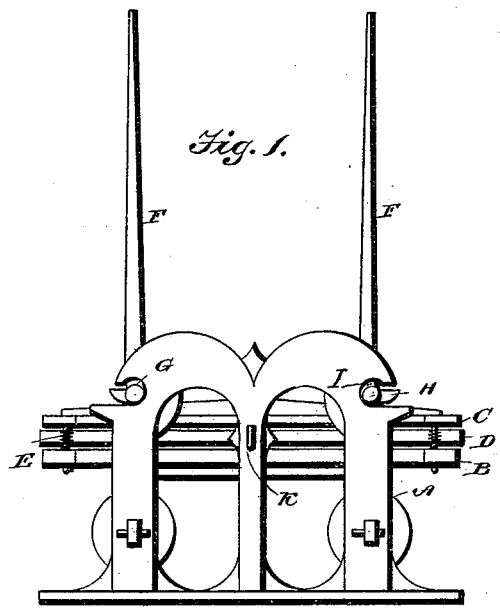
Fig. 1.
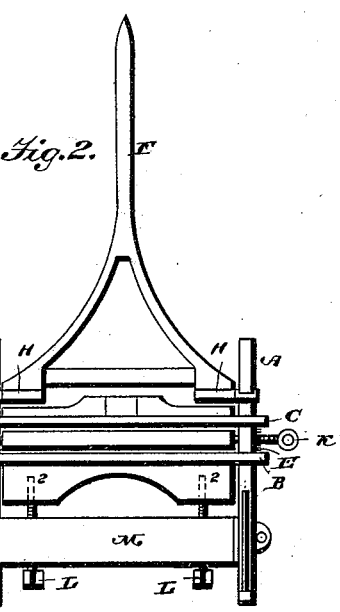
Fig. 2.
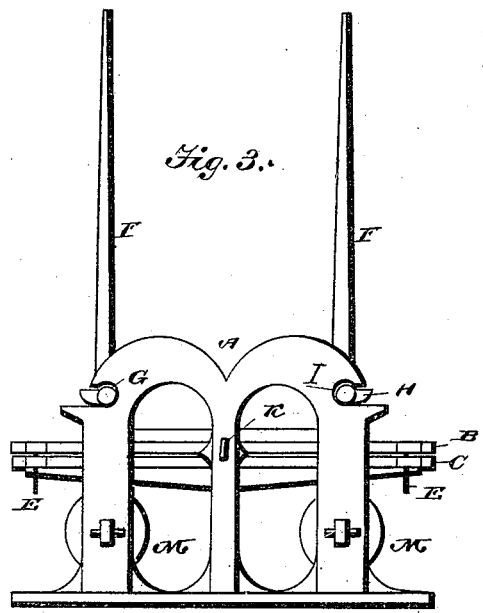
Fig. 3.
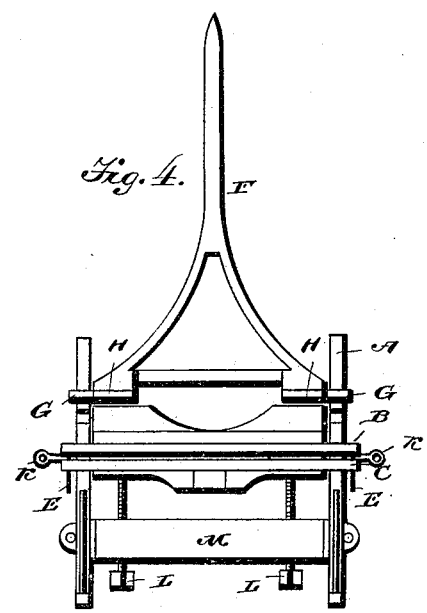
Fig. 4.
Witnesses: 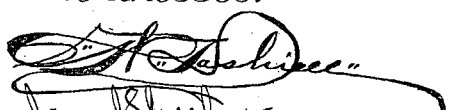
Inventor:
Charles G. Schulze.
By W. R. Stringfellow
Attorney (No Model.) 2 Sheets—Sheet 2.

C. G. SCHULZE.
PRESS FOR MOLDING VULCANIZED RUBBER STAMPS, &c.

No. 419,290. Patented Jan. 14, 1890.

Witnesses:

Inventor:
Charles G. Schulze.
By W. R. Stringfellow
Attorney.

UNITED STATES PATENT OFFICE.

CHARLES G. SCHULZE, OF NEW ORLEANS, LOUISIANA.

PRESS FOR MOLDING VULCANIZED RUBBER STAMPS, &c.

SPECIFICATION forming part of Letters Patent No. 419,290, dated January 14, 1890.

Application filed February 16, 1889. Serial No. 300,103. (No model.)

*To all whom it may concern:*

Be it known that I, CHARLES G. SCHULZE, a citizen of the United States, residing at New Orleans, in the parish of Orleans and State of Louisiana, have invented certain new and useful Improvements in Molding-Presses and Vulcanizers for Rubber Stamps, Electrotypes, and Stereotyping; and I do declare the following to be a full, clear, and exact description of the invention, such as will enable others skilled in the art to which it appertains to make and use the same.

My invention relates to a new and useful improvement in presses which are adapted for use in the process of making molded vulcanized rubber stamps and impressing-plates for electrotypes and stereotypes, which improvement will be fully understood from the following description and claim, taken in connection with the annexed drawings, in which—

Figure 5:
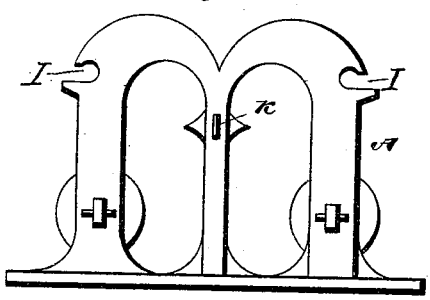
Figure 6:
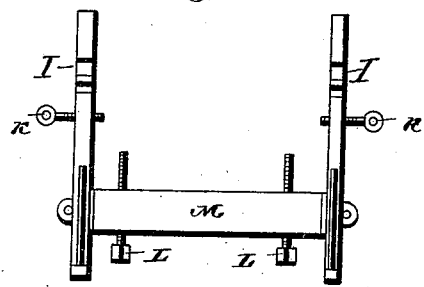
Figure 7:
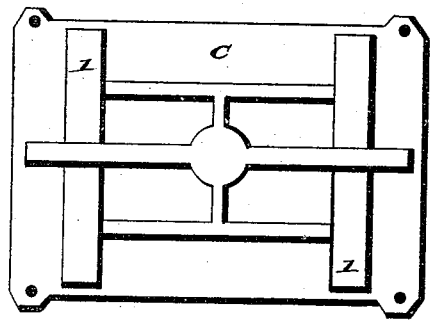
Figure 8:
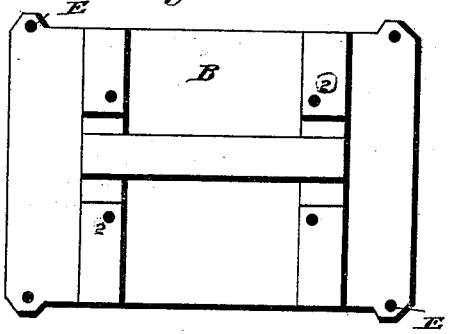
Figure 9:
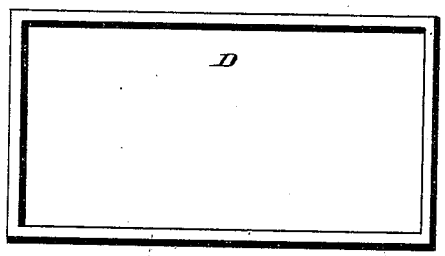

Figure 1 is a side view of the press. Fig. 2 is an end view of the press. Fig. 3 is a side view of the press with the type-chase detached and plates reversed. Fig. 4 is an end view of Fig. 3. Fig. 5 is a side view of the press-frame. Fig. 6 is an end view of Fig. 5. Fig. 7 is a top view of the platen C. Fig. 8 is a view of one side of the follower B. Fig. 9 is a type-chase.

Referring to the annexed drawings by letter, A A designate the vertical cheeks or sides of my press, which are substantially connected together by horizontal transverse tie-bars M. In this frame is rigidly supported by screws L L a platen B, re-enforced by bottom ribs and having a smooth upper surface. Above this platen is a horizontal follower C, re-enforced by ribs and provided on its upper side with raised bearings $l\, l$, for a purpose presently explained. This follower C is supported upon helical springs E, coiled about vertical guiding-posts located near the four corners of the said follower, which posts are rigidly secured to the latter and passed freely through the platen.

F F designate two bifurcated levers, which are provided with fulcrum-trunnions G, adapted to be received in notches I, made in the cheeks A A of the press-frame, and to be readily removed from said notches when desired. These levers are also provided with segmental toes H, which in operating the levers to depress the follower C impinge upon the bearing-ribs $l\, l$. (Shown in Fig. 7.)

D designates a type-chase, which is a rectangular frame adapted to have locked in it the type for making the impression in the rubber or other stamp material. This chase is held in a rigid position upon the platen B by means of set-screws K K, tapped through the cheeks A A of the press-frame.

It will be observed from the above description that by my improvements I am able to apply an even pressure upon the follower and prevent the same from springing during the act of making an impression; also, that in consequence thereof the stamp when produced will be of even thickness. It will also be observed that the platen can be adjusted vertically and its parallelism with respect to the follower preserved.

In vulcanizing I remove type-chase D, and platen B and follower C are placed in the position as shown in Fig. 3, with a strip of rubber between these plates, and by means of handles F, I place the press and plates upon a stove and reverse each side of the press in a similar manner to an ordinary pair of waffle-irons, except that the handles F are on each side of the press, and when drawn down are held in a positive position, and by means of set-screws L either plate, when used as a bed-plate, can be adjusted properly, set-screws K being used when type-chase D is placed between platen B and follower C.

When the press is used, as shown in Fig. 3, the springs on rods E are removed.

Having described my invention, what I claim is—

In a molding-press for the purpose described, the combination of the cheek-plates of the main frame, notched at I I, the follower C, vertically adjustable therein by means of the screws L, the platen B, connected to the follower C by means of guide-rods E, provided with coiled springs, the lever F, provided with toes H and fulcrum-trunnions G, and removably applied to the said main frame, the type-chase D, and the retaining-screws therefor tapped through the cheeks of the main frame, all as specified.

In testimony whereof I affix my signature in presence of two witnesses.

CHARLES G. SCHULZE.

Witnesses:
JOHN A. ADAMS,
PERCY D. PARKS.